(No Model.)
C. BEGER.
Velocipede.
No. 242,252.     Patented May 31, 1881.
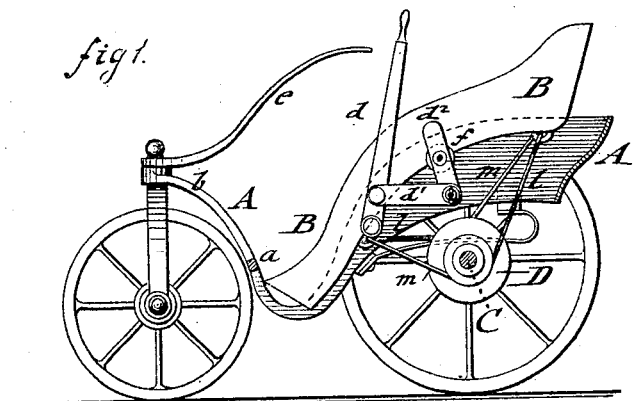
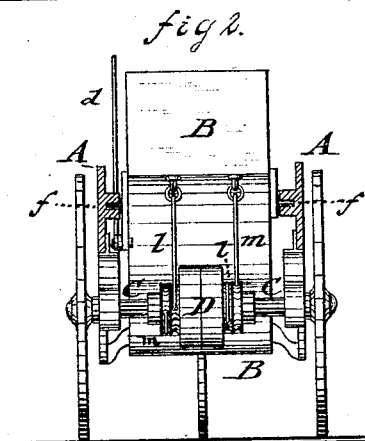
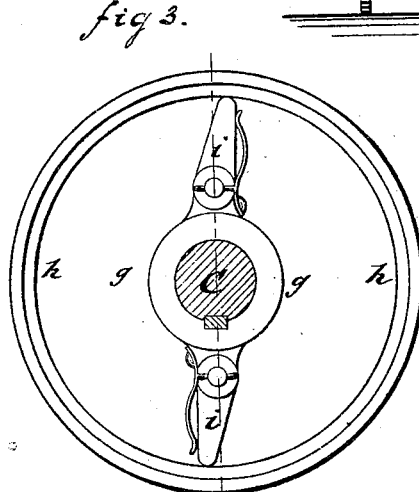
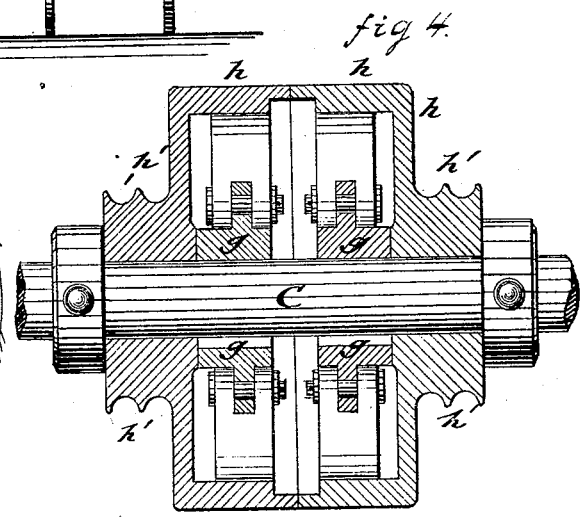
WITNESSES:
Carl Karp
Otto Risch
INVENTOR
Carl Beger
BY Paul Goepel
ATTORNEY

UNITED STATES PATENT OFFICE.

CARL BEGER, OF BERLIN, GERMANY, ASSIGNOR TO HIMSELF AND GUSTAF LIEDMAN, OF SAME PLACE.

VELOCIPEDE.

SPECIFICATION forming part of Letters Patent No. 242,252, dated May 31, 1881.

Application filed April 1, 1881. (No model.)

*To all whom it may concern:*

Be it known that I, CARL BEGER, of the city of Berlin, in the Kingdom of Prussia, German Empire, have invented certain new and useful Improvements in Velocipedes, of which the following is a specification.

This invention relates to improvements in velocipedes in which the propulsion is obtained by the rocking or oscillating motion of a seat arranged within the body of the vehicle; and the invention consists of a body supported by springs upon the hind axle and provided at its front end with a steering-wheel and lever. To fulcra of the vehicle-body is hung a rocking seat, which is connected by means of belts, cords, or chains with an alternately-working mechanism on the hind axle, by which continuous rotary motion is imparted to the same. The rocking motion may be assisted by a hand-lever at one or both sides of the seat, which are connected by pivot-links with fixed arms of the seat.

In the accompanying drawings, Figure 1 represents a sectional side elevation of my improved velocipede; Fig. 2, a rear elevation of the same, partly in vertical transverse section; and Figs. 3 and 4 are detail vertical transverse and longitudinal sections of the mechanism for imparting rotary motion of the hind axle.

Similar letters of reference indicate corresponding parts.

Referring to the drawings, A represents an open-bottomed wagon-body, which is supported by suitable springs on the hind axle, C. The side walls of the body A diminish gradually in height from the rear end toward the front end, and are curved downward, as shown in Fig. 1, they being connected by a transverse bar, $a$, at the front part, from which extends a curved arm, $b$, to the upper end of which is swiveled the center bolt of a yoke-shaped frame applied to the axle of the front guide-wheel. A lever, $e$, is applied to the center bolt of the yoke-frame, by which the vehicle is steered in the usual well-known manner.

B represents a rocking seat, with a back and foot rest, which is hung by fulcra $f$ to bearings at the inside of the vehicle-body A. For the purpose of assisting the rocking motion of the seat B a lever, $d$, is pivoted at its lower end to the side wall of the seat, and connected by a pivot-link, $d'$, with a fixed crank-arm, $d^2$, of the seat, so that on oscillating the lever to and fro the seat will follow the motion of the same. The lever is especially useful in starting the motion of the seat, or in assisting the same when passing over rising ground, and, if desired, a second lever may be arranged at the opposite side. The rocking motion of the seat B is utilized for the forward propulsion of the vehicle by means of a power-transmitting mechanism, D, which changes it into a rotary motion of the hind axle, C. The transmitting mechanism D is applied to the hind axle, C, and is shown in detail in Figs. 3 and 4. It consists of two collars, $g$, which are rigidly keyed to the axle C, and of loosely-turning flanged disks $h\ h$, which are arranged sidewise of the collars $g$ in such a manner that their flanges form contact with each other and form a kind of box around the collar $g$. Each disk $h$ is provided at its outside with a central pulley, having grooves $h'$, to each of which a cord, belt, or chain, $l$ and $m$, is applied. To the inner collars, $g$, are hinged spring-acted dogs $i$ in such a manner that when either of the disks $h\ h$ is turned in the direction of the arrow, Fig. 3, the axle C is carried along, while by turning the disk in the opposite direction the dogs are released from the flanges of the disks, and admit thereby the turning of the disks on the axle.

The cords, belts, and chains $l$ and $m$ are wound in opposite direction to each other upon the grooved pulley $h'\ h'$, and are connected at their opposite ends respectively to points at the upper and lower part of the rocking seat B. While the cords, belts, or chains $l\ l$ impart by the rocking motion of the seat B a forward turning motion to both disks $h\ h$, and thereby to the axle C, the belts or chains $m\ m$ are simultaneously unwound, so as to carry that disk $h$ which is not at that moment in use for forward motion back to its former position, ready to be engaged again by the dogs $i$ for forward motion, as shown in Fig. 3. The alternate winding and unwinding of the cords, belts, or chains $l$ and $m$ impart a continuous rotary motion to the axle C, and consequently a regular forward propulsion of the vehicle. The same propelling mechanism may also be employed for railroad hand-cars, marine velocipedes, and similar vehicles, in which case, however, the transmitting mechanism D has to be placed on an auxiliary axle, which is connected by means of gearing, so that the vehicle can be moved in forward or backward direction.

Having thus described my invention, I claim as new and desire to secure by Letters Patent—

1. As an improvement in velocipedes, the combination of a rocking seat, B, hung to an open-bottomed body, A, with transmitting mechanism D, applied to the hind axle, and with cords, belts, or chains $l\ l\ m\ m$ connected thereto, so as to change the rocking motion of the seat into a continuous rotary motion of the axle, substantially as and for the purpose set forth.

2. As an improvement in velocipedes, the combination of an open-bottomed wagon-body, A, rocking seat B, suspended therein, connecting-cords $l\ l$ and $m\ m$, flanged disks $h\ h$, having grooved pulleys $h'\ h'$, and interior collars, $g\ g$, having hinged and spring-acted dogs $i\ i$, substantially as and for the purpose set forth.

3. As an improvement in velocipedes, the combination of an open-bottomed body, A, rocking seat B, suspended therein, transmitting mechanism D, applied to the hind axle, whereby the rocking motion of the seat is changed into a rotary motion of the axle, and a hand lever or levers, $d$, pivoted to the rocking seat and connected to a fixed arm or arms, $d^2$, back of the lever, to assist the rocking motion of the seat, substantially as set forth.

In testimony that I claim the foregoing as my invention I have signed my name, in presence of two witnesses, this 5th day of February, 1881.

CARL BEGER.

Witnesses:
OSCAR STEIN,
BERTHOLD ROI.